US009093879B2

(12) United States Patent
Oinuma et al.

(10) Patent No.: US 9,093,879 B2
(45) Date of Patent: Jul. 28, 2015

(54) METHOD AND DEVICE FOR REDUCING CONCENTRATIONS OF OZONE AND NITRIC ACID GENERATED IN COOLING AIR FLOWING THROUGH CIRCULATING AIRFLOW PATHS IN ROTARY ELECTRIC MACHINES

(75) Inventors: Gaku Oinuma, Tokyo (JP); Noboru Wada, Tokyo (JP); Yasuhiro Tanimura, Tokyo (JP); Takayoshi Shimada, Tokyo (JP); Katsuhiko Kibe, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 13/697,976

(22) PCT Filed: Jun. 1, 2011

(86) PCT No.: PCT/JP2011/062625
§ 371 (c)(1),
(2), (4) Date: Nov. 14, 2012

(87) PCT Pub. No.: WO2011/155375
PCT Pub. Date: Dec. 15, 2011

(65) Prior Publication Data
US 2013/0058850 A1    Mar. 7, 2013

(30) Foreign Application Priority Data

Jun. 10, 2010  (JP) ................................. 2010-133155

(51) Int. Cl.
*B01D 53/46* (2006.01)
*H02K 9/26* (2006.01)
(Continued)

(52) U.S. Cl.
CPC  *H02K 9/26* (2013.01); *B01D 53/04* (2013.01); *B01D 53/8675* (2013.01); *B01D 2251/11* (2013.01); *B01D 2253/102* (2013.01); *B01D 2257/40* (2013.01); *B01D 2258/06* (2013.01)

(58) Field of Classification Search
None
See application file for complete search history.

(56) References Cited

U.S. PATENT DOCUMENTS 3,804,942 A * 4/1974 Kato et al. ................. 423/239.1
5,232,886 A * 8/1993 Yoshimoto et al. ............ 502/84
(Continued)

FOREIGN PATENT DOCUMENTS

EP        0 186 477     12/1985
JP        03 000472      2/1928
(Continued)

OTHER PUBLICATIONS

Faria et al., "Ozone Decomposition in Water Catalyzed by Activated Carbon: Influence of Chemical and Textural Properties", Ind. Eng. Chem. Res. 2006, 45, 2715-2721.*

(Continued)

*Primary Examiner* — Ngoc-Yen Nguyen
*Assistant Examiner* — Anita Nassiri Motlagh
(74) *Attorney, Agent, or Firm* — Oblon, McClelland, Maier & Neustadt, L.L.P.

(57) ABSTRACT

The present invention provides a method for reducing concentrations of ozone and nitric acid produced in cooling air flowing through a circulating airflow path of a rotary electric machine, the method including: disposing an ozone decomposition unit containing an ozone decomposition catalyst in the circulating airflow path; and allowing the cooling air to pass through the ozone decomposition unit so as to decompose ozone and to suppress production of nitric acid. According to the present invention, the method and device are capable of reducing the concentrations of ozone and nitric acid produced in the cooling air flowing through the circulating airflow path of the rotary electric machine for a long period of time while preventing pressure loss.

11 Claims, 6 Drawing Sheets

(51) Int. Cl.
  *B01D 53/04* (2006.01)
  *B01D 53/86* (2006.01)

(56) References Cited

U.S. PATENT DOCUMENTS

| | | | |
|---|---|---|---|
| 5,445,798 A | * | 8/1995 | Ikeda et al. ............... 422/121 |
| 6,340,066 B1 | | 1/2002 | Dettling et al. |
| 2008/0156070 A1 | | 7/2008 | Kojima et al. |

FOREIGN PATENT DOCUMENTS

| | | | |
|---|---|---|---|
| JP | 55 82071 | | 6/1980 |
| JP | 6 16818 | | 3/1991 |
| JP | 06-236132 A | | 8/1994 |
| JP | 09-299746 | * | 11/1997 |
| JP | 2001 252340 | | 9/2001 |
| JP | 3310861 | | 8/2002 |
| JP | 2003 111356 | | 4/2003 |
| JP | 2005 233161 | | 9/2005 |
| JP | 2006 153825 | | 6/2006 |

OTHER PUBLICATIONS

Sigmund Jaffe and Hadley W. Ford, "The Photolysis of Nitrogen Dioxide in the Presence of Nitric Acid at 3669 A and 25°", The Journal of Physical Chemistry, vol. 71, No. 6, May 1967, pp. 1832-1836.*

Oda et al., "Nitric Oxide Decomposition in Air by Using Nonthermal Plasma Processing with Additives and Catalyst", IEEE Transactions on Industry Applications, vol. 34, No. 2, Mar./Apr. 1998, pp. 268-272.*

International Search Report Issued Jun. 28, 2011 in PCT/JP11/062625 Filed Jun. 1, 2011.

Office Action issued Oct. 1, 2013 in Japanese Patent Application No. 2012-519346 (with English language translation).

European Office Action issued Feb. 19, 2015 in connection with corresponding European Patent Application No. 11 79 2332, filed Jun. 1, 2011.

* cited by examiner

METHOD AND DEVICE FOR REDUCING CONCENTRATIONS OF OZONE AND NITRIC ACID GENERATED IN COOLING AIR FLOWING THROUGH CIRCULATING AIRFLOW PATHS IN ROTARY ELECTRIC MACHINES

TECHNICAL FIELD

The present invention relates to a method and a device for reducing concentrations of ozone and nitric acid produced in cooling air flowing through a circulating airflow path in a rotary electric machine using air as a cooling medium.

BACKGROUND ART

Rotary electric machines such as a generator or an electric motor usually have members such as a stator and a rotor. Particularly in an air-cooled turbine generator, cooling air is supplied to a circulating airflow path in the generator so that the stator, the rotor, and the like are cooled. The stator of this air-cooled turbine generator is usually formed of a core and a coil wound around the core, on which treatment for preventing partial discharge is performed. However, the partial discharge may occur due to various factors such as deterioration over time of winding insulation or a partial discharge inhibitor. Then, when the partial discharge occurs in the generator in which humid air circulates in the same manner as outside air, ozone ($O_3$), nitrogen oxides (NOx), nitric acid, and the like are produced and spread in the generator along with the air circulation. As a result, metal members (for example, bolts and aluminum fins) in the generator may be corroded, or organic materials may be deteriorated. Therefore, it is necessary to reduce ozone, nitric acid, and the like.

Similarly, in large electric motors as well, ozone, nitrogen oxides, nitric acid, and the like may be produced in the circulating airflow path due to the partial discharge caused by high electric fields. Therefore, in large electric motors as well, it is necessary to reduce ozone, nitric acid, and the like from the viewpoint of suppressing corrosion of metal members and improving the working environment.

There are several methods proposed for reducing ozone, nitrogen oxides, nitric acid, and the like.

For instance, Patent Document 1 proposes a method of disposing a filter device including a removing agent for removing at least one of ozone and nitric acid gas in the circulating airflow path of a rotary electric machine. In this method, activated carbon (adsorbent) is used as the removing agent for ozone, and a chemical adsorbent is used as the removing agent for nitric acid gas, and hence concentrations of ozone and nitric acid gas are reduced by the respective adsorbents.

In addition, Patent Document 2 proposes a method involving reacting difficult to adsorb NOx (NO and $NO_2$) with ozone so as to produce nitric acid, adsorbing and removing nitric acid using a silicon adsorbent, and decomposing and removing residual ozone using an ozone decomposition catalyst.

CITATION LIST

Patent Documents

Patent Document 1: JP 2003-111356 A
Patent Document 2: JP 3310861 B

DISCLOSURE OF THE INVENTION

Problems to be Solved by the Invention

However, the methods of Patent Documents 1 and 2 have the following problems.

In the method of Patent Document 1, ozone and nitric acid are removed separately by activated carbon and by a chemical adsorbent, and hence it is necessary to place a large amount of activated carbon and chemical adsorbent in the circulating airflow path. Therefore, pressure loss in the circulating airflow path increases so that the amount of cooling air circulating in the circulating airflow path is decreased. As a result, in the air-cooled rotary electric machines to which the method of Patent Document 1 is applied, the desired cooling performance may not be obtained. In addition, when nitric acid is adsorbed and removed by the chemical adsorbent, performance thereof is lowered in a relatively short period of time. Therefore, it is necessary to frequently replace or regenerate the chemical adsorbent. Because it is necessary to stop the machine for replacing or regenerating the chemical adsorbent, the operating rate of the machine is lowered.

In the method of Patent Document 2, NOx is reacted with ozone to produce nitric acid, which is adsorbed and removed by a silicon adsorbent. However, since it is necessary to positively cause this reaction, the quantity of nitric acid to be processed is increased. Therefore, performance of the adsorbent is rapidly lowered. In reality, corrosion of metal members is caused by ozone and nitric acid, and the influence of NOx itself is small. In addition, the quantity of NOx itself is small. Therefore, it is not always necessary to remove NOx. Further, in the method of Patent Document 2, it is necessary to sequentially circulate air in an adsorption tower filled with a silicon adsorbent and a catalyst tower filled with an ozone decomposition catalyst (namely, multiple stages of the adsorption tower and the catalyst tower are disposed in series). Therefore, when this structure is adopted for a circulating airflow path, pressure loss is increased.

The present invention has been made to solve the above-mentioned problems, and it is an object thereof to provide a method and a device, which are capable of reducing concentrations of ozone and nitric acid produced in the cooling air flowing through the circulating airflow path of a rotary electric machine for a long period of time while preventing pressure loss.

Means for Solving the Problems

The inventors of the present invention have conducted extensive studies to solve the above-mentioned problems. As a result, the inventors have found that it is possible to reduce not only the ozone concentration but also the nitric acid concentration easily and significantly by allowing the cooling air flowing through the circulating airflow path in the rotary electric machine to pass through an ozone decomposition unit or a combined unit including an ozone decomposition catalyst.

That is, the present invention provides a method for reducing concentrations of ozone and nitric acid produced in cooling air flowing through a circulating airflow path of a rotary electric machine, the method including: disposing an ozone decomposition unit containing an ozone decomposition catalyst in the circulating airflow path; and allowing the cooling air to pass through the ozone decomposition unit so as to decompose ozone and to suppress production of nitric acid.

Further, the present invention provides a device for reducing concentrations of ozone and nitric acid produced in cooling air flowing through a circulating airflow path of a rotary electric machine, the device including an ozone decomposition unit containing an ozone decomposition catalyst, the device allowing the cooling air to pass through the ozone decomposition unit so as to decompose ozone and to suppress production of nitric acid.

Effects of the Invention

According to the present invention, a method and device are provided, which are capable of reducing the concentrations of ozone and nitric acid produced in the cooling air flowing through the circulating airflow path of a rotary electric machine for a long period of time while preventing pressure loss.

MODES FOR CARRYING OUT THE INVENTION

A method for reducing concentrations of ozone and nitric acid produced in cooling air flowing through a circulating airflow path of a rotary electric machine according to preferred embodiments of the present invention are described below with reference to the drawings. Note that in the following embodiments, the method of the present invention is described based on examples in which the method is applied to an air-cooled turbine generator, but these are merely examples. It is understood that the method of the present invention can be applied to rotary electric machines other than air-cooled turbine generators.

First Embodiment

Figure 1:
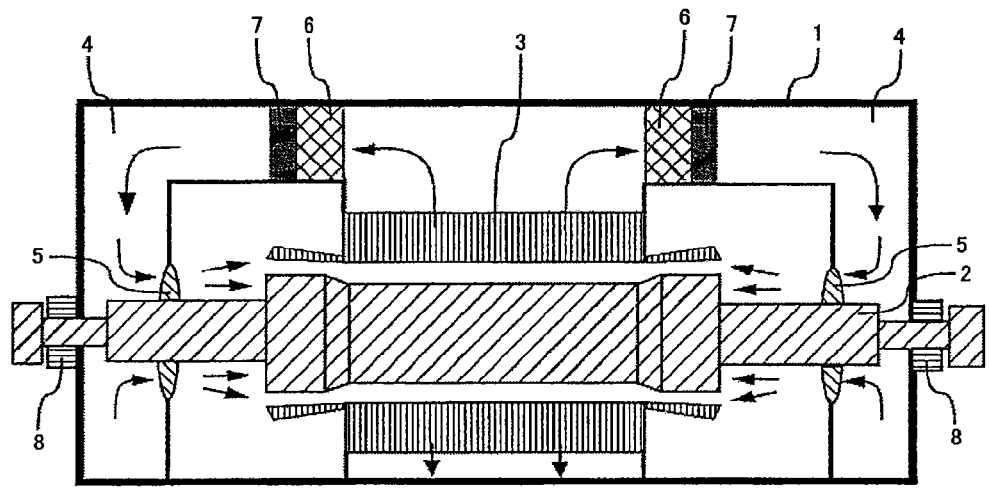
[FIG. 1] A cross-sectional view of an air-cooled turbine generator to which a method according to a first embodiment of the present invention is applied.

FIG. 1 is a cross-sectional view of an air-cooled turbine generator to which a method of this embodiment is applied.

In FIG. 1, the air-cooled turbine generator includes a frame 1, a rotor 2, a stator 3, a fan 5, an air cooler 6, an ozone decomposition unit 7, and bearings 8. In this air-cooled turbine generator, the rotor 2 having the fan 5 mounted thereto, the stator 3, the air cooler 6, and the ozone decomposition unit 7 are disposed in the frame 1 having a totally enclosed structure, and a rotation shaft of the rotor 2 is supported by the frame 1 with the bearings 8. In addition, a circulating airflow path 4 is formed so that cooling air sent by pressure from the fan 5 circulates around the rotor 2, the stator 3, the air cooler 6, the ozone decomposition unit 7, and the fan 5 in this order. Note that, in this air-cooled turbine generator, the ozone decomposition unit 7 is disposed on a downstream side of the air cooler 6, but the position of this ozone decomposition unit 7 is not particularly limited. The position of the ozone decomposition unit 7 can be determined appropriately in consideration of the structure of the generator and ease of mounting and demounting the ozone decomposition unit 7.

In this air-cooled turbine generator, the cooling air made to flow through the circulating airflow path 4 by the drive of the fan 5 passes through the rotor 2 and the stator 3 to cool them, and then passes through the air cooler 6 and the ozone decomposition unit 7 to flow back to the fan 5. The circulating airflow path 4 is closed from the outside, but a small amount of air is replaced with the outside air via clearances in the bearings 8 and the like. Therefore, air as humid as the outside air circulates in the circulating airflow path 4. In this case, when partial discharge occurs in the stator 3, discharge products such as ozone, NOx, and nitric acid are produced and spread in the generator along with circulation of the cooling air. In particular, nitric acid corrodes metal members significantly even at a low concentration, while it is difficult to decompose and remove nitric acid by a catalyst or the like. Therefore, conventionally, as described in Patent Document 1 or Patent Document 2, a method for adsorbing and removing nitric acid using an adsorbent has been used in general. However, in large rotary electric machines in particular, even if the concentration of nitric acid is low, the volume of the cooling air is very large, and hence the quantity of nitric acid to be removed is increased, with the result that performance of the adsorbent is lowered in a short period. Therefore, preventing the production of nitric acid is an optimal means for suppressing corrosion of metal members and deterioration of organic materials.

In the air-cooled turbine generator of this embodiment, the ozone decomposition unit 7 is disposed in the circulating airflow path 4, and hence ozone is decomposed when the cooling air passes through the ozone decomposition unit 7 so that the ozone concentration in the cooling air is lowered, and along with this, nitric acid is also inhibited from being produced. As a result, it is possible to suppress corrosion of metal materials in the air-cooled turbine generator.

Here, an effect of reducing the ozone concentration by allowing the cooling air to pass through the ozone decomposition unit 7 disposed in the circulating airflow path 4 is described.

Figure 2:
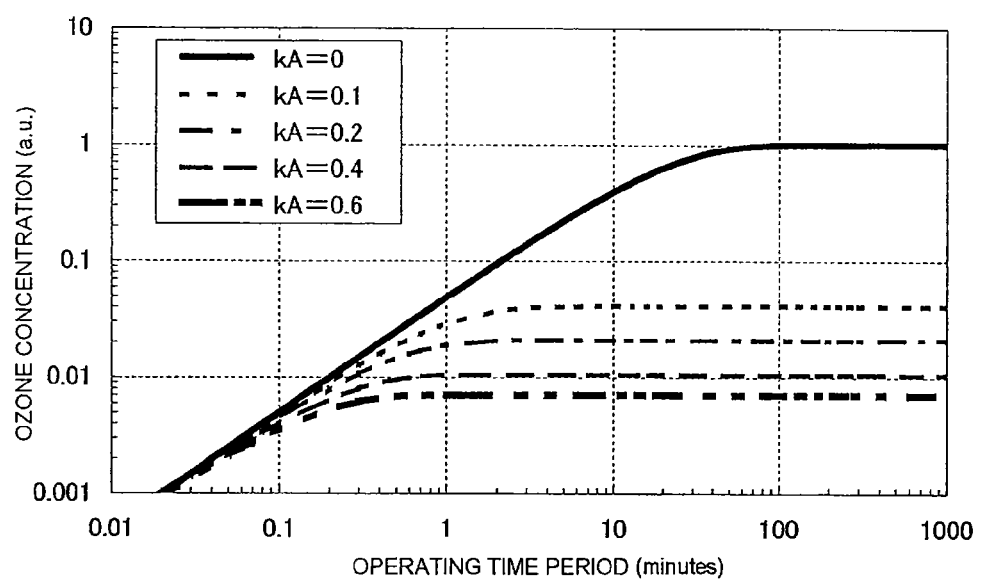
[FIG. 2] A graph showing a relationship between an operating time period of the air-cooled turbine generator and an ozone concentration in cooling air flowing through a circulating airflow path.

FIG. 2 is a graph showing a relationship between an operating time period of the air-cooled turbine generator and the ozone concentration in the cooling air flowing through the circulating airflow path 4. This graph is based on the supposition of a real operating condition of the air-cooled turbine generator and in consideration of ozone production due to partial discharge in the stator 3, exchange between the cooling air and the outside air via clearances in the bearings 8 and the like, and decomposition of ozone by the ozone decomposition unit 7. Here, in this graph, a steady-state ozone concentration in the cooling air flowing through the circulating airflow path 4 when the ozone decomposition unit 7 is not disposed is regarded as one (arbitrary unit: a.u.) as a reference, and an ozone concentration when the ozone decomposition unit 7 is disposed is shown as a relative value.

As to the ozone decomposition unit 7 disposed in the circulating airflow path 4, it is supposed that "k" represents the ratio of the cooling air passing through the ozone decomposition unit 7 to the entire cooling air flowing through the circulating airflow path 4, and "A" represents the ratio of ozone that is decomposed when passing through the ozone decomposition unit 7 one time (one-pass ozone removing ratio) (provided that the ratio of the cooling air is one when the entire cooling air flowing through the circulating airflow path 4 passes through the ozone decomposition unit 7, and that the one-pass ozone removing ratio is one when the entire ozone is decomposed when passing through the ozone decomposition unit 7 one time). Then, when kA=0 holds (namely, when the ozone decomposition unit 7 is not disposed), the ozone concentration reaches the steady-state value in approximately one hour from the activation of the air-cooled turbine generator. In contrast, when the kA value is increased (namely, when the ozone decomposition unit 7 is disposed), the ozone concentration is significantly reduced. For instance, when kA=0.6 holds, the ozone concentration is reduced to $\frac{1}{100}$ or lower compared to the case of kA=0.

Next, an effect of reducing the nitric acid concentration by allowing the cooling air to pass through the ozone decomposition unit 7 disposed in the circulating airflow path 4 is described.

When humid cooling air flows through the circulating airflow path 4, if partial discharge occurs in the stator 3, the following reactions (1) to (9) occur in general.

$$e + O_2 \rightarrow e + 2O \qquad (1)$$

$$e + N_2 \rightarrow e + 2N \qquad (2)$$

$$O + O_2 + M \rightarrow O_3 + M \qquad (3)$$

$$N + O + M \rightarrow NO + M \qquad (4)$$

$$O_2 + 2NO \rightarrow 2NO_2 \qquad (5)$$

$$O_3 + NO \rightarrow NO_2 + O_2 \qquad (6)$$

$$O_3 + NO_2 \rightarrow NO_3 + O_2 \qquad (7)$$

$$NO_2 + NO_3 + M \rightarrow N_2O_5 + M \qquad (8)$$

$$N_2O_5 + H_2O \rightarrow 2HNO_3 \qquad (9)$$

In other words, electrons (e) generated by the partial discharge in the stator 3 collide with oxygen molecules ($O_2$) and nitrogen molecules ($N_2$) in the cooling air flowing through the circulating airflow path 4 so as to produce oxygen atoms (O) and nitrogen atoms (N)<Reactions (1) and (2)>. Next, the produced oxygen atoms (O) are reacted with oxygen molecules ($O_2$) in the air via a third body (M) such as oxygen molecules ($O_2$) or nitrogen molecules ($N_2$) so as to produce ozone ($O_3$) <Reaction (3)>. In addition, the produced nitrogen atoms (N) are reacted with the produced oxygen atoms (O) via the third body (M) so as to produce nitrogen monoxide (NO)<Reaction (4)>. Next, the produced nitrogen monoxide (NO) is reacted with oxygen molecules ($O_2$) in the air so as to produce nitrogen dioxide ($NO_2$) <Reaction (5)>. In addition, the produced nitrogen monoxide (NO) is reacted with the produced ozone ($O_3$) so as to produce nitrogen dioxide ($NO_2$) <Reaction (6)>. Next, the produced nitrogen dioxide ($NO_2$) is reacted with the produced ozone ($O_3$) so as to produce nitrogen trioxide ($NO_3$)<Reaction (7)>. Next, the produced nitrogen dioxide ($NO_2$) and nitrogen trioxide ($NO_3$) are reacted via the third body (M) so as to produce dinitrogen pentoxide ($N_2O_5$)<Reaction (8)>. Then, finally, the produced dinitrogen pentoxide ($N_2O_5$) is reacted with moisture ($H_2O$) contained in the air and moisture adhering to a surface of a member so as to produce nitric acid ($HNO_3$)<Reaction (9)>.

In consideration of the above-mentioned reactions, it is understood that when dinitrogen pentoxide ($N_2O_5$) is not produced, the above-mentioned reaction (9) does not occur, and nitric acid is not produced. According to the method of this embodiment, the ozone decomposition unit 7 disposed in the circulating airflow path 4 decomposes ozone so as to reduce the ozone concentration in the cooling air flowing through the circulating airflow path 4. Therefore, it is possible to suppress the reaction of producing nitrogen trioxide ($NO_3$) that may be a factor of producing dinitrogen pentoxide ($N_2O_5$) (the above-mentioned reaction (7)). As a result, the production of nitric acid can be suppressed. Here, in the above-mentioned reaction (7), the production rate of nitrogen trioxide ($NO_3$) depends on concentrations of ozone ($O_3$) and nitrogen dioxide ($NO_2$), and therefore it is preferred to set a ratio between these concentrations to a value within an appropriate range.

Next, the inventors of the present invention evaluated concentrations of $O_3$ and nitrogen oxides (NO, $NO_2$, $NO_3$, $N_2O_5$) in the cooling air flowing through the circulating airflow path 4 under various conditions in consideration of the above-mentioned reactions (1) to (9) supposing the real operating condition of an air-cooled turbine generator.

Figure 3:
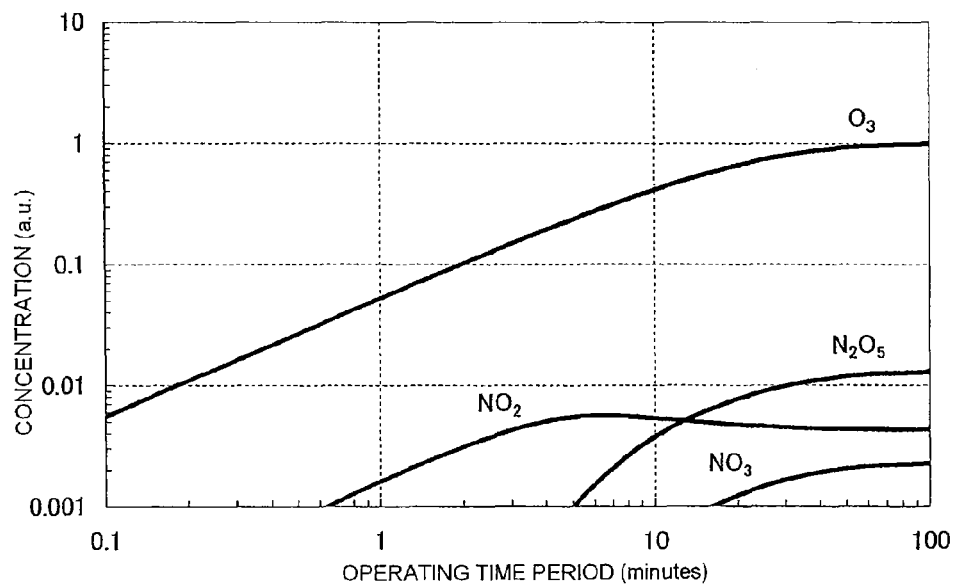
[FIG. 3] A graph showing a relationship between the operating time period of the air-cooled turbine generator and concentrations of $O_3$ and nitrogen oxides ($NO$, $NO_2$, $NO_3$, $N_2O_5$) in the cooling air flowing through the circulating airflow path (in the case of kA=0).
Figure 4:
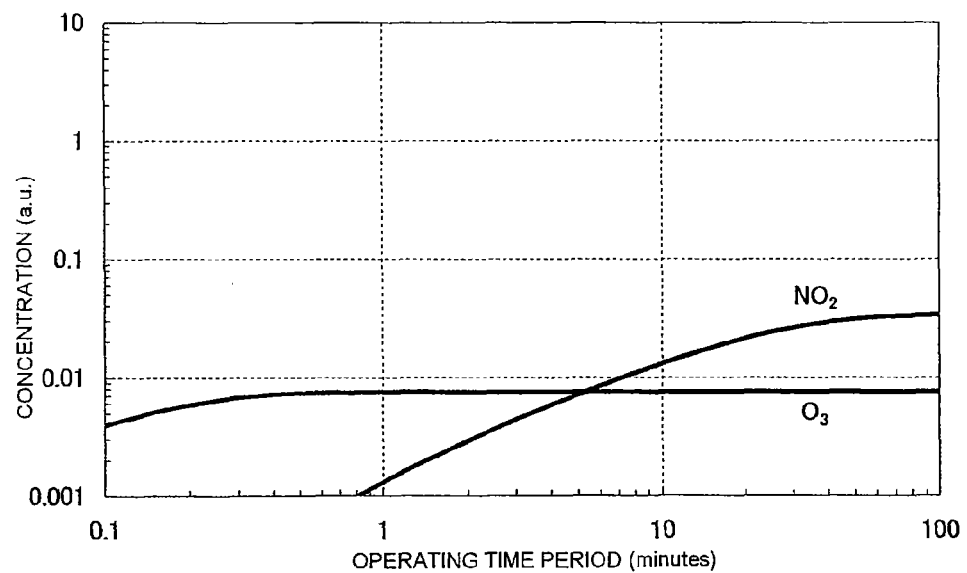
[FIG. 4] A graph showing a relationship between the operating time period of the air-cooled turbine generator and concentrations of $O_3$ and nitrogen oxides ($NO$, $NO_2$, $NO_3$, $N_2O_5$) in the cooling air flowing through the circulating airflow path (in the case of kA=0.6).

FIGS. 3 and 4 are graphs showing a relationship between the operating time period of the air-cooled turbine generator and the concentrations of $O_3$ and nitrogen oxides (NO, $NO_2$, $NO_3$, $N_2O_5$) in the cooling air flowing through the circulating airflow path 4. Here, in FIGS. 3 and 4, similarly to FIG. 2, the steady-state ozone concentration in the cooling air flowing through the circulating airflow path 4 when the ozone decomposition unit 7 is not disposed is regarded as one (arbitrary unit: a.u.) as a reference, and concentrations of components in a predetermined case are shown as relative values. FIG. 3 shows a result in the case of kA=0 (namely, when the ozone decomposition unit 7 is not disposed), and FIG. 4 shows a result in the case of kA=0.6 (namely, when the ozone decomposition unit 7 is disposed).

In the case of kA=0, after 100 minutes from the activation, the ozone concentration was 1, and the $N_2O_5$ concentration was approximately 0.013. In consideration of the above-mentioned reaction (9), $N_2O_5$ is reacted with moisture contained in the air or moisture adhering to a surface of a member so as to produce two nitric acid molecules. Therefore, in this case, it is considered that nitric acid is produced at a concentration of 0.026 at the maximum.

In contrast, in the case of kA=0.6, after 100 minutes from the activation, the ozone concentration was approximately 0.008, and the $N_2O_5$ concentration was 0.001 or lower (not shown). Therefore, in this case, it is considered that nitric acid is produced at a concentration of 0.002 or lower.

From the above-mentioned results, it is possible to suppress production of nitric acid by reducing the ozone concentration.

Figure 5:
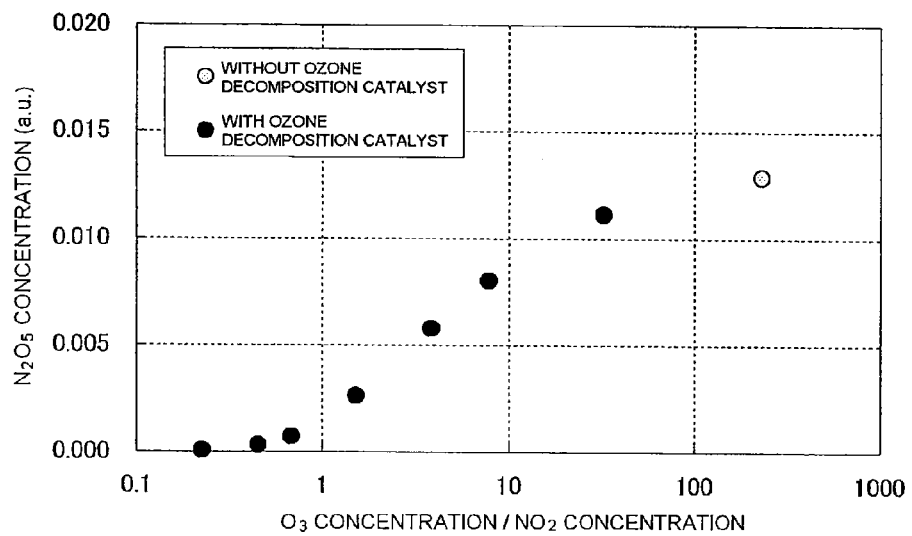
[FIG. 5] A graph showing a relationship between a ratio of an $O_3$ concentration to an $NO_2$ concentration ($O_3$ concentration/$NO_2$ concentration) and an $N_2O_5$ concentration in the cooling air flowing through the circulating airflow path of the air-cooled turbine generator.

FIG. 5 is a graph showing a relationship between the ratio of the $O_3$ concentration to the $NO_2$ concentration ($O_3$ concentration/$NO_2$ concentration) and the $N_2O_5$ concentration in the cooling air flowing through the circulating airflow path 4.

In FIG. 5, when the ozone decomposition unit 7 was not disposed, the $O_3$ concentration/$NO_2$ concentration was approximately 230, and the $N_2O_5$ concentration was also as high as approximately 0.013. In contrast, when the ozone decomposition unit 7 was disposed, the $O_3$ concentration/$NO_2$ concentration and the $N_2O_5$ concentration became lower than in the case where the ozone decomposition unit 7 was not disposed. In particular, by setting the $O_3$ concentration/$NO_2$ concentration to one or lower, the $N_2O_5$ concentration was reduced to approximately 1/10 of the case where the ozone decomposition unit 7 was not provided. In other words, by setting the $O_3$ concentration/$NO_2$ concentration to one or lower, production of nitric acid can be also reduced to approximately 1/10 of the case where the ozone decomposition unit 7 is not provided. Further, the rate of corrosion of metal members and the rate of deterioration of organic materials depend on concentrations of ozone and nitric acid, and therefore, they are significantly suppressed by applying the method of the present invention.

The $O_3$ concentration/$NO_2$ concentration changes in accordance with the kA value, temperature and humidity of the cooling air, the condition of occurrence of the partial discharge, and the like. Therefore, it is necessary to select the type and composition of the catalyst and the quantity of the catalyst, and to determine the shape and mounting position of the ozone decomposition unit 7 so that the $O_3$ concentration/$NO_2$ concentration in a predetermined range can be obtained in accordance with the apparatus to be used.

In general, when the kA value of the ozone decomposition unit 7 is increased, the $O_3$ concentration/$NO_2$ concentration is lowered so that the nitric acid concentration is reduced. However, the kA value is also related to the quantity of the ozone decomposition catalyst in the ozone decomposition unit 7, and hence, when the kA value is increased too much, pressure loss in the circulating airflow path 4 is increased. In general, it is preferred to set the kA value to 0.1 to 0.9. When the kA value is smaller than 0.1, the ozone concentration is not sufficiently reduced, and hence the $O_3$ concentration/$NO_2$ concentration may not be set to one or smaller. On the other hand, when the kA value is larger than 0.9, the quantity of the ozone decomposition catalyst is increased so that the pressure loss may be increased. In addition, even when the kA value is 0.9 or smaller, a sufficient effect of reducing ozone and nitric acid can be obtained so that corrosion of metal materials and deterioration of organic materials are suppressed. Therefore, further increase in the kA value causes increase in cost but does not contribute to improvement in performance.

On the other hand, in order to obtain a high kA value, it is important to increase the ratio of the cooling air passing through the ozone decomposition unit 7, and it is preferred to dispose the ozone decomposition unit 7 so as to occupy the entire cross section of the circulating airflow path 4.

The ozone decomposition unit 7 is not particularly limited, but may have a honeycomb structure, may be a sheet-like fiber filter, or may have a structure in which the catalyst is impregnated into a pellet base material. From the viewpoint of reducing the pressure loss, it is preferred to adopt the honeycomb structure.

In addition, the ozone decomposition catalyst used for the ozone decomposition unit 7 is not particularly limited as long as it can decompose ozone. For instance, manganese dioxide-based catalysts, precious metal-based catalysts such as a Pt or Pd catalyst, and base metal-based catalysts such as a Fe, Ni, Ag, or Co catalyst may be mentioned. One of these catalysts can be used solely, or two or more of these catalysts can be used in combination.

In addition, the size of the ozone decomposition unit 7 is not particularly limited and may be determined appropriately in accordance with the structure or the like of the apparatus to which the method of this embodiment is applied.

In the method of this embodiment, it is preferred that the ozone concentration in the cooling air after passing through the ozone decomposition unit 7 be 10% to 90% of the ozone concentration in the cooling air before passing through the ozone decomposition unit 7. In this range, it is possible to sufficiently suppress production of nitric acid.

Based on the air-cooled turbine generator to which the method of this embodiment is applied, it is possible to reduce concentrations of ozone and nitric acid for a long period of time while suppressing pressure loss by allowing the cooling air to pass through the ozone decomposition unit 7 disposed in the circulating airflow path 4. In particular, in this air-cooled turbine generator, the ozone decomposition unit 7 suppresses production of nitric acid, and hence it is not necessary to process ozone and nitric acid separately, and to use the adsorbent for removing nitric acid. Therefore, it is not necessary to perform replacement or regeneration of the adsorbent, and hence long periods of continuous operation are possible.

Second Embodiment

Figure 6:
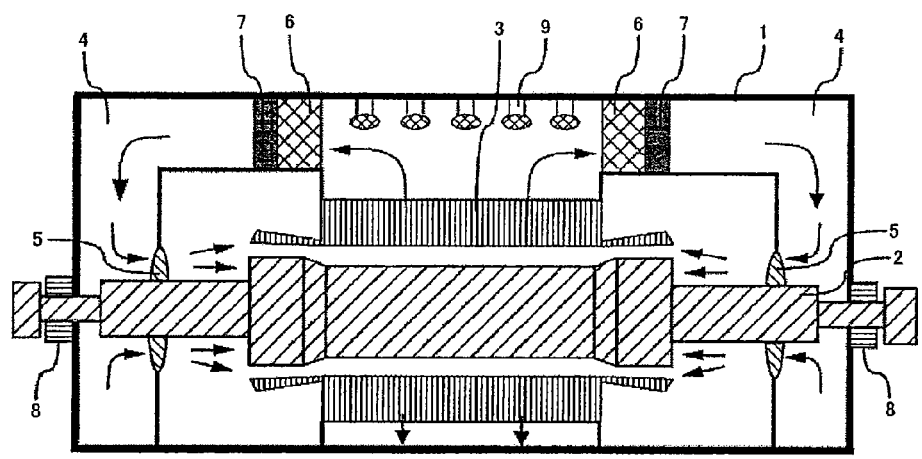
[FIG. 6] A cross-sectional view of an air-cooled turbine generator to which a method according to a second embodiment of the present invention is applied.

FIG. 6 is a cross-sectional view of an air-cooled turbine generator to which a method of this embodiment is applied. Note that, the basic structure of the air-cooled turbine generator of this embodiment is the same as the structure of the air-cooled turbine generator of the first embodiment, and therefore the same parts are represented by the same reference numerals or symbols so that overlapping description is omitted.

In FIG. 6, the air-cooled turbine generator includes a light source 9 in the circulating airflow path 4.

In the air-cooled turbine generator of the first embodiment, the ozone decomposition unit 7 decomposes ozone produced in the cooling air flowing through the circulating airflow path 4, and hence the production of nitric acid can be suppressed. However, when a partial discharge occurs in the stator 3, a very small quantity of nitrogen trioxide ($NO_3$) may be produced by the above-mentioned reaction (7) in a period until the cooling air exposed to the partial discharge passes through the ozone decomposition unit 7. This can cause a problem particularly in a case where the circulating cooling air flows at low speed, in a case where the distance between the stator 3 and the ozone decomposition unit 7 is large, and in a case where the partial discharge occurs in a wide range. Then, when $NO_3$ is produced, $N_2O_5$ is produced by the above-mentioned reaction (8), and further, nitric acid is produced by the above-mentioned reaction (9).

Here, it is known that $NO_3$ absorbs light having a wavelength of 600 nm or larger and 700 nm or smaller and is decomposed by the following reactions (see, for example, W. B. DeMore et al., "Chemical Kinetics and Photochemical Data for Use in Stratospheric Modeling", JPL Publication 97-4, 1997, pp. 160-163).

$$NO_3 + h\nu \rightarrow NO_2 + O \qquad (10)$$

$$NO_3 + h\nu \rightarrow NO + O_2 \qquad (11)$$

Based on the air-cooled turbine generator of this embodiment, the light source 9 is used in the circulating airflow path 4 so that the cooling air flowing through the circulating airflow path 4 is irradiated with light having a wavelength of 600 nm to 700 nm. Thus, the reactions (10) and (11) occur, and hence $NO_3$ produced by partial discharges is decomposed. As a result, the production of nitric acid can be further suppressed.

The light source 9 is not limited in particular as long as it can emit light having a wavelength of 600 nm to 700 nm. For instance, an incandescent lamp, a fluorescent lamp, a light emitting diode, or the like can be used. In addition, the intensity of light from the light source 9 is not limited in particular and should be determined appropriately in consideration of the position of the light source 9, the flow rate of the circulating cooling air, the quantity of produced $NO_3$, and the like. Further, the irradiation with light from the light source 9 is not necessarily performed constantly, but may be performed at regular intervals in consideration of the concentration of $NO_3$ and the photodecomposition rate of $NO_3$. When the irradiation is performed at regular intervals, power consumption can be reduced, and the life of the light source 9 can be elongated.

Note that, the light source 9 is disposed between the stator 3 and the air cooler 6 in the circulating airflow path 4 of this air-cooled turbine generator, but the position of the light source 9 is not limited in particular. The position of the light source 9 may be determined appropriately in consideration of the structure of the circulating airflow path 4.

Third Embodiment

Figure 7:
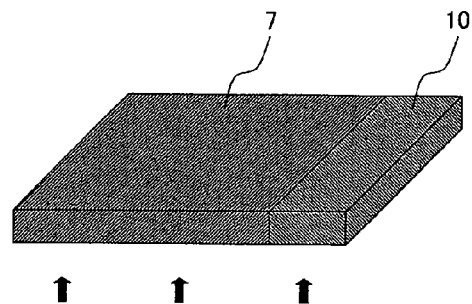
[FIG. 7] A perspective view of an ozone decomposition unit and a nitric acid adsorption unit which are used for a method according to a third embodiment of the present invention.

FIG. 7 is a perspective view of the ozone decomposition unit and a nitric acid adsorption unit which are used for a method of this embodiment. In FIG. 7, the ozone decomposition unit 7 and a nitric acid adsorption unit 10 are disposed in parallel with respect to the flow of the cooling air (arrows).

In the first embodiment, production of nitric acid can be suppressed by decomposing ozone. Further, in the second embodiment, production of nitric acid can be suppressed by photodecomposition of $NO_3$. However, when partial discharge occurs in humid air, a very small quantity of nitric acid may also be produced by the following reactions.

$$e + H_2O \rightarrow e + OH + H \qquad (12)$$

$$NO_2 + OH \rightarrow HNO_3 \qquad (13)$$

In other words, when the partial discharge occurs in humid cooling air, water molecules are dissociated by electron collision so that OH is produced <Reaction (12)>. Then, OH is reacted with $NO_2$ so that nitric acid is produced <Reaction (13)>. The life of OH is very short, and the reaction (13) occurs only in the vicinity of a discharge field. Therefore, the production rate of nitric acid is lower compared to the reaction (9). However, in high humidity environments in particular, the concentration of nitric acid is increased by the reactions (12) and (13), and hence it may be necessary to remove nitric acid.

On the other hand, the concentration of nitric acid produced by partial discharges is usually approximately 10% or lower of the ozone concentration, and the quantity of nitric acid that needs to be removed is much smaller than the quantity of ozone to be removed.

Here, there is described an effect of reducing the ozone concentration and the nitric acid concentration by allowing the air to pass through the ozone decomposition unit 7 and the nitric acid adsorption unit 10 disposed in parallel with respect to the flow of the cooling air in the circulating airflow path 4.

Figure 8:
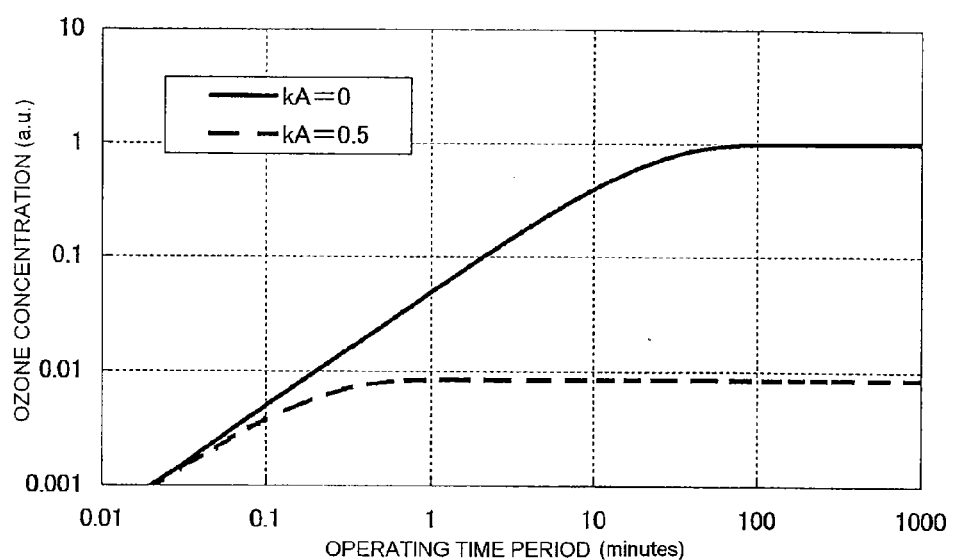
[FIG. 8] A graph showing a relationship between the operating time period of the air-cooled turbine generator and an ozone concentration in the cooling air flowing through the circulating airflow path.
Figure 9:
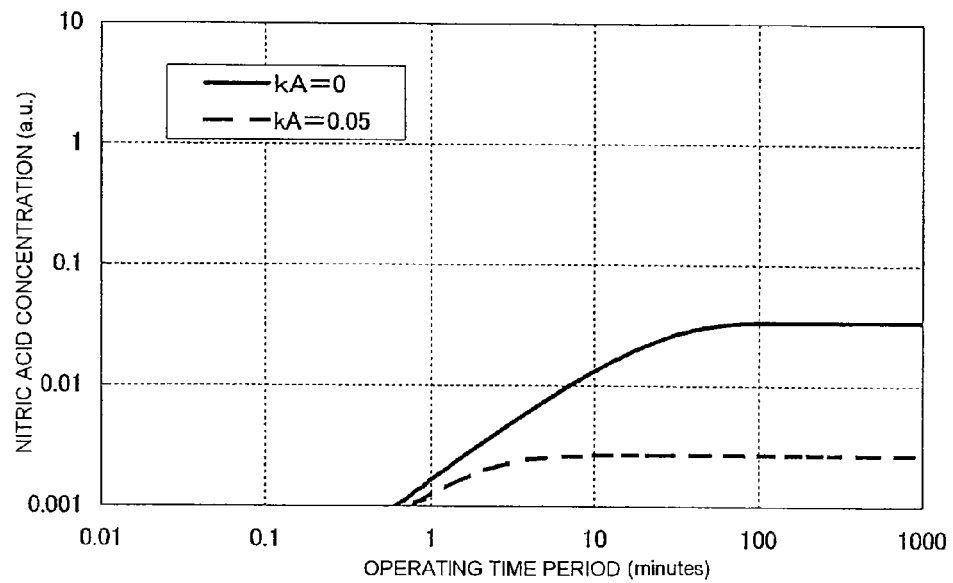
[FIG. 9] A graph showing a relationship between the operating time period of the air-cooled turbine generator and a nitric acid concentration in the cooling air flowing through the circulating airflow path.

As shown in FIG. 2, when the ozone decomposition unit 7 is disposed in the circulating airflow path 4, the ozone concentration in the cooling air is decreased along with increase in the kA value. Similarly, when the nitric acid adsorption unit 10 is disposed in parallel to the ozone decomposition unit 7 in the circulating airflow path 4, the same principle holds not only for the ozone concentration but also for the nitric acid concentration in the cooling air. In other words, as to the nitric acid concentration in the cooling air, it is supposed that "k" represents the ratio of the cooling air passing through the nitric acid adsorption unit 10 to the entire cooling air flowing through the circulating airflow path 4, and "A" represents the ratio of nitric acid that is adsorbed when passing through the nitric acid adsorption unit 10 one time (one-pass nitric acid adsorbing ratio) (provided that the ratio of the cooling air is one when the entire cooling air flowing through the circulating airflow path 4 passes through the nitric acid adsorption unit 10, and that the one-pass nitric acid adsorbing ratio is one when the entire nitric acid is adsorbed when passing through the nitric acid adsorption unit 10 one time). As shown in FIGS. 8 and 9, when kA=0 holds (namely, when the ozone decomposition unit 7 and the nitric acid adsorption unit 10 are not provided), steady-state values of the ozone concentration and the nitric acid concentration reach 1 and approximately 0.03, respectively, in approximately one hour from the activation of the air-cooled turbine generator.

In contrast, when the kA value is increased (namely, when the ozone decomposition unit 7 and the nitric acid adsorption unit 10 are provided), the ozone concentration and the nitric acid concentration are significantly reduced. For instance, when the kA value for ozone is 0.5 (for example, when k=0.9 and A=0.55 hold), and when the kA value for nitric acid is 0.05 (for example, when k=0.1 and A=0.5 hold), as shown in FIGS. 8 and 9, steady-state values of the ozone concentration and the nitric acid concentration are reduced to approximately 0.008 and approximately 0.003, respectively.

Note that, in this embodiment, the ozone decomposition unit 7 and the nitric acid adsorption unit 10 are disposed in parallel with respect to the flow of the cooling air, but the ozone concentration and the nitric acid concentration are reduced also in a case where the ozone decomposition unit 7 and the nitric acid adsorption unit 10 are disposed in series. However, in this case, the nitric acid adsorption unit 10 is separately disposed also for nitric acid at a smaller concentration compared to that of ozone existing in the cooling air. Therefore, the device structure is complicated, and pressure loss is increased. In contrast, in this embodiment, the ozone decomposition unit 7 and the nitric acid adsorption unit 10 are disposed in parallel with respect to the flow of the cooling air, and hence the device structure is simple, and pressure loss is not increased. Therefore, in this embodiment, ozone and nitric acid can be easily and efficiently removed.

The nitric acid adsorbent used for the nitric acid adsorption unit 10 is not limited in particular as long as it can adsorb nitric acid. For instance, zeolite, activated carbon, silica gel, or limestone can be used. In addition, one of these nitric acid adsorbents can be used solely, or two or more of these nitric acid adsorbents can be used in combination.

In addition, the size of the nitric acid adsorption unit 10 is not limited in particular and may be determined appropriately in accordance with the structure or the like of the apparatus to which the method of this embodiment is applied. The size of the nitric acid adsorption unit 10 may be the same as or different from the size of the ozone decomposition unit 7.

Note that, the ratio between the ozone decomposition unit 7 and the nitric acid adsorption unit 10 may be determined appropriately in accordance with the production quantity of ozone and nitric acid or target concentrations of ozone and nitric acid. In general, the concentration of nitric acid produced by the partial discharge in the cooling air is approximately 10% or lower of the ozone concentration. Therefore, when the cross sectional area of the circulating airflow path 4 is set as a reference, it is preferred to set the area of the ozone decomposition unit 7 to 90% or higher and to use the remaining area for the nitric acid adsorption unit 10.

Fourth Embodiment

Figure 10:
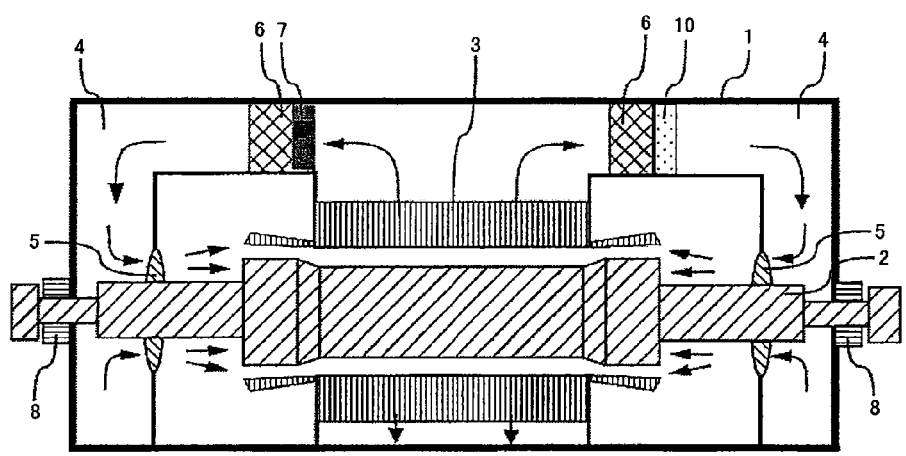
[FIG. 10] A cross-sectional view of an air-cooled turbine generator to which a method according to a fourth embodiment of the present invention is applied.

FIG. 10 is a cross-sectional view of an air-cooled turbine generator to which a method of this embodiment is applied. Note that, the basic structure of the air-cooled turbine generator of this embodiment is the same as the structure of the air-cooled turbine generator of the first embodiment, and therefore the same parts are represented by the same reference numerals or symbols so that overlapping description is omitted.

There are many air-cooled turbine generators having a structure in which the circulating airflow path 4 is branched as illustrated in FIG. 10, and the air cooler 6 is disposed in each of the branched circulating airflow paths 4, independently. In an air-cooled turbine generator having this structure, the cooling air after passing through the stator 3 passes through each of the branched circulating airflow paths 4.

In FIG. 10, the air-cooled turbine generator has a structure in which the ozone decomposition unit 7 is disposed on the upstream side of one of the air coolers 6 in the circulating airflow path 4, and the nitric acid adsorption unit 10 is disposed on the downstream side of another of the air coolers 6 in the circulating airflow path 4. With this structure, the ozone decomposition unit 7 disposed on the upstream side of the one of the air coolers 6 removes ozone so as to reduce the production quantity of nitric acid, and the nitric acid adsorption unit 10 disposed on the downstream side of the other of the air coolers 6 adsorbs and removes nitric acid produced in a very small quantity. As a result, it is possible to further reduce the nitric acid concentration in the cooling air.

Further, in general, the ozone decomposition unit 7 decomposes ozone by catalyst reaction, and hence has a long life and does not need frequent replacement. In contrast, the nitric acid adsorption unit 10 has a limit in the adsorbing performance of the adsorbent so that the performance is lowered in a relatively short period of time, and hence the nitric acid adsorption unit 10 needs to be replaced frequently. In the air-cooled turbine generator to which the method of this embodiment is applied, the ozone decomposition unit 7 and the nitric acid adsorption unit 10 are disposed in separate circulating airflow paths 4. Therefore, when performance of the nitric acid adsorption unit 10 is lowered, the nitric acid adsorption unit 10 can be replaced by opening only one of the circulating airflow paths 4. Therefore, replacement can be facilitated.

In addition, ozone decomposing performance of the catalyst is higher as the temperature is higher, and nitric acid adsorbing performance of the adsorbent is higher as the temperature is lower. Therefore, the ozone decomposition unit 7 is disposed at a high-temperature part on the upstream side of the air cooler 6, while the nitric acid adsorption unit 10 is disposed at a low-temperature part on the downstream side of the air cooler 6. Thus, performance of each of the catalyst and the adsorbent can be realized at the maximum.

Fifth Embodiment

An air-cooled turbine generator of this embodiment includes a combined unit formed of a mixture of the ozone decomposition catalyst and the nitric acid adsorbent in the circulating airflow path 4.

In the third embodiment, concentrations of ozone and nitric acid can be reduced by allowing the cooling air to pass through the ozone decomposition unit 7 and the nitric acid adsorption unit 10 disposed in parallel with respect to the flow of the cooling air. On the other hand, in this embodiment, the combined unit formed of the mixture of the ozone decomposition catalyst and the nitric acid adsorbent is disposed in the cooling airflow path 4, and the cooling air is allowed to pass through the combined unit. Thus, similarly to the third embodiment, the concentrations of ozone and nitric acid can be reduced. In particular, this is realized by the single combined unit, and hence the structure can be simplified.

As described in the third embodiment, the concentration of nitric acid produced by the partial discharge is approximately 10% or lower of the ozone concentration. Therefore, also in the combined unit, it is preferred to set the ratio of the ozone decomposition catalyst to 90% or higher and to assign the remaining ratio to the nitric acid adsorbent. Thus, the very small quantity of nitric acid remaining can be efficiently adsorbed and removed while the production quantity of nitric acid can be significantly suppressed.

The combined unit is not limited in particular. For instance, it is possible to adopt a combined unit in which a manganese dioxide-based catalyst as the ozone decomposition catalyst is impregnated into a part of one honeycomb structure, and activated carbon as the nitric acid adsorbent is impregnated into the remaining part. Alternatively, it is possible to use a combined unit in which a manganese dioxide-based catalyst as the ozone decomposition catalyst is borne at a surface of activated carbon as the nitric acid adsorbent. However, the ozone decomposition catalyst and the nitric acid adsorbent are not limited in particular as long as they have an ozone decomposing function and a nitric acid adsorbing function, respectively. In addition, the combined unit may be a combination of several types of combined units.

In the method of this embodiment, it is preferred that the ozone concentration in the cooling air after passing through the combined unit be 10% to 90% of the ozone concentration in the cooling air before passing through the combined unit. In this range, it is possible to sufficiently suppress production of nitric acid.

In the air-cooled turbine generator to which the method of this embodiment is applied, it is possible to suppress production of nitric acid by decomposing produced ozone by the ozone decomposition catalyst contained in the combined unit. In addition, the concentration of the very small quantity of produced nitric acid can be further reduced by adsorbing and removing nitric acid by the nitric acid adsorbent contained in the combined unit. Further, in this air-cooled turbine generator, it is not necessary to dispose the ozone decomposition unit 7 and the nitric acid adsorption unit 10 independently unlike the third embodiment. Therefore, the structure can be simplified.

Sixth Embodiment

Figure 11:
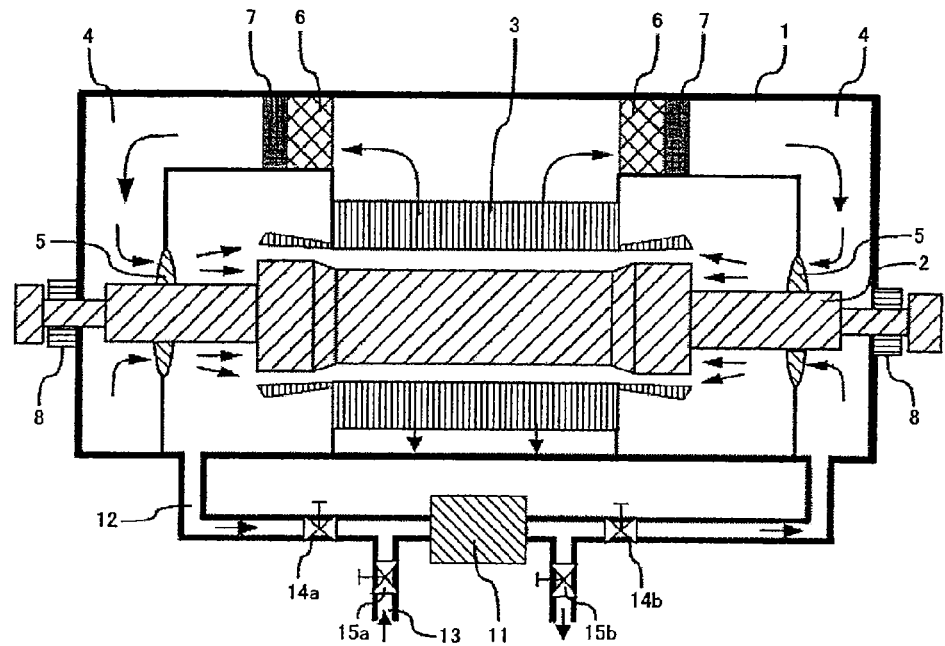
[FIG. 11] A cross-sectional view of an air-cooled turbine generator to which a method according to a sixth embodiment of the present invention is applied.

FIG. 11 is a cross-sectional view of an air-cooled turbine generator to which a method of this embodiment is applied. Note that, the basic structure of the air-cooled turbine generator of this embodiment is the same as the structure of the air-cooled turbine generator of the first embodiment, and therefore the same parts are represented by the same reference numerals or symbols so that overlapping description is omitted.

In FIG. 11, the air-cooled turbine generator includes a nitric acid removal unit 11 in a bypass airflow path 12 for bypassing a part of the cooling air flowing through the circulating airflow path 4. In the bypass airflow path 12, there are disposed valves 14a and 14b in front of and behind the nitric acid removal unit 11, and a branched regeneration airflow path 13 is formed between the nitric acid removal unit 11 and each of the valves 14a and 14b. Then, valves 15a and 15b are disposed in the regeneration airflow path 13.

The nitric acid removal unit 11 is not limited in particular as long as it can remove nitric acid, and the above-mentioned nitric acid adsorption unit 10 can be used therefor. In addition, it is possible to use means for removing nitric acid with water using a scrubber or the like instead of the nitric acid adsorption unit 10.

Note that, when the nitric acid concentration in the cooling air is sufficiently low and the performance of the nitric acid removal unit 11 is not lowered for a long period of time, it is not necessary to provide the regeneration airflow path 13, and the valves 14a, 14b, 15a, and 15b. This is because opportunities for regenerating the nitric acid removal unit 11 are rare, and it is less expensive to replace the nitric acid removal unit 11.

As described in the third embodiment, when the partial discharge occurs in humid cooling air, water molecules are dissociated by electron collision so that the OH produced is reacted with $NO_2$ to produce nitric acid. The quantity of nitric acid is much smaller compared to the quantity of ozone. Therefore, the nitric acid concentration can be reduced by allowing the cooling air to pass through the nitric acid removal unit 11 disposed in the bypass airflow path 12 for bypassing a part of the cooling air flowing through the circulating airflow path 4.

Next, an operation of the air-cooled turbine generator to which the method of this embodiment is applied is described. In this air-cooled turbine generator, the valves 14a and 14b are opened while the valves 15a and 15b are closed, and the cooling air in the circulating airflow path 4 is circulated by the fan 5. Thus, a part of the cooling air is sucked into the bypass airflow path 12 by a pressure difference between the portions in front of and behind the fan 5. Then, the cooling air sucked into the bypass airflow path 12 passes through the nitric acid removal unit 11 disposed in the bypass airflow path 12, and nitric acid in the cooling air is removed at that time. In addition, when the performance of the nitric acid removal unit 11 to remove acid nitric is lowered, the valves 14a and 14b are closed, while the valves 15a and 15b are opened. Then, high-temperature air is supplied through the regeneration airflow path 13 so that the nitric acid removal unit 11 is regenerated. After the regeneration of the nitric acid removal unit 11 is finished, the valves 14a and 14b are opened while the valves 15a and 15b are closed, and the cooling air in the circulating airflow path 4 is circulated by the fan 5. In this manner, adsorption of nitric acid in the cooling air is restarted.

When the volume of the cooling air guided into the bypass airflow path 12 is too large, cooling performance may be lowered. When the volume of the cooling air guided into the bypass airflow path 12 is too small, the desired effect of reducing the nitric acid concentration may not be obtained. Therefore, it is preferred to adjust the volume of the cooling air guided into the bypass airflow path 12 based on the structure of the device, the concentration of nitric acid in the cooling air, the required cooling performance, the quantity of nitric acid removed, and the like.

In addition, high-temperature air is used for regeneration of the nitric acid removal unit 11 in the above description, but the means for regenerating the nitric acid removal unit 11 is not limited to this. As the means for regenerating the nitric acid removal unit 11, it is possible to use a medium that can regenerate the nitric acid removal unit 11. For instance, air, steam, or water at approximately room temperature and that does not contain nitric acid can be used.

In the air-cooled turbine generator to which the method of this embodiment is applied, it is possible to decompose produced ozone by the ozone decomposition unit 7 so as to suppress production of nitric acid, and to remove produced nitric acid by the nitric acid removal unit 11. Therefore, it is possible to significantly reduce the ozone concentration and the nitric acid concentration in the cooling air. Thus, this air-cooled turbine generator can suppress corrosion of metal members and deterioration of organic materials.

In addition, in this air-cooled turbine generator, it is possible to regenerate the nitric acid removal unit 11. Therefore, it is not necessary to replace the nitric acid adsorption unit 10 unlike the third embodiment. Further, in this air-cooled turbine generator, a part of the cooling air can be sucked into the bypass airflow path 12 by the pressure difference between the portions in front of and behind the fan 5. Therefore, it is not necessary to use a power source such as a blower.

Seventh Embodiment

Figure 12:
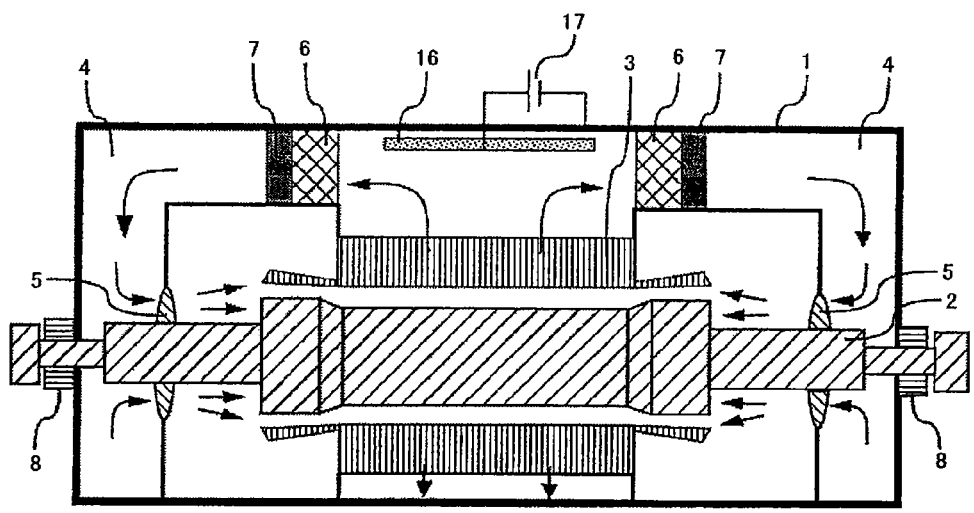
[FIG. 12] A cross-sectional view of an air-cooled turbine generator to which a method according to a seventh embodiment of the present invention is applied.

FIG. 12 is a cross-sectional view of an air-cooled turbine generator to which a method of this embodiment is applied. Note that, the basic structure of the air-cooled turbine generator of this embodiment is the same as the structure of the air-cooled turbine generator of the first embodiment, and therefore the same parts are represented by the same reference numerals or symbols so that overlapping description is omitted.

In FIG. 12, the air-cooled turbine generator includes a charged plate 16 connected to a DC power supply 17 in the circulating airflow path 4.

Nitric acid produced by the partial discharge may exist in the cooling air in the form of nitric acid ions ($NO_3^-$) having negative charge in which hydrogen atoms are dissociated. Therefore, in this air-cooled turbine generator, the charged plate 16 is charged positively by the DC power supply 17, and the charged plate 16 is brought into contact with the cooling air flowing through the circulating airflow path 4. Thus, the nitric acid ions are adsorbed to the charged plate 16 in an electrostatic manner. Thus, it is possible to further reduce the concentration of nitric acid in the cooling air flowing through the circulating airflow path 4.

The charged plate 16 is not particularly limited, and metal materials such as aluminum, iron, copper, and stainless steel; activated carbon; and insulation materials such as alumina ceramics having a conductive layer therein may be mentioned. For instance, when a metal material such as aluminum, iron, or copper is used, the charged plate 16 itself is sacrificed to be corroded by the adsorbed nitric acid ions, and hence other metal components in the apparatus can be kept from being corroded for a long period of time. In addition, when a metal material such as stainless steel is used, corrosion by the adsorbed nitric acid ions proceeds slowly. Therefore, by demounting and cleaning regularly, the charged plate 16 can be used continuously for a long period of time. Further, when an insulation material such as alumina ceramics is used, production of nitrate does not occur. Therefore, the cooling air can be kept clean.

Note that, the charged plate 16 is disposed between the stator 3 and the air cooler 6 in the circulating airflow path 4 in this air-cooled turbine generator, but the position of the charged plate 16 is not limited. The position of the charged plate 16 may be determined appropriately in consideration of the structure of the circulating airflow path 4. In addition, the size of the charged plate 16 is not limited in particular and may be determined appropriately in consideration of the quantity of nitric acid ions produced.

In the air-cooled turbine generator to which the method of this embodiment is applied, produced ozone is decomposed by the ozone decomposition unit 7, and hence production of nitric acid is suppressed. In addition, the charged plate 16 which is charged positively can adsorb the nitric acid ions in an electrostatic manner. Therefore, the nitric acid concentration in the cooling air can be significantly reduced. Thus, in this air-cooled turbine generator, corrosion of metal members can be suppressed. In addition, the charged plate 16 is used for removing nitric acid, and hence pressure loss is small.

The invention claimed is:

1. A method for reducing concentrations of ozone and nitric acid produced in cooling air flowing through a circulating airflow path of a rotary electric machine, the method comprising:
   disposing an ozone decomposition unit comprising an ozone decomposition catalyst and a nitric acid adsorption unit comprising a nitric acid adsorbent in parallel with respect to a flow of the cooling air in the circulating airflow path so that in one-pass the cooling air in the circulating airflow path passes through only one of the ozone decomposition catalyst or the nitric acid adsorption unit; and
   passing a portion of the cooling air through the ozone decomposition unit, thereby decomposing ozone; and passing the remaining portion of the cooling air through the nitric acid adsorption unit, thereby adsorbing and removing nitric acid.

2. The method of claim 1, further comprising:
   disposing a nitric acid removal unit in a bypass airflow path configured to bypass a part of the cooling air flowing through the circulating airflow path.

3. The method of claim 1, further comprising:
   irradiating the cooling air flowing through the circulating airflow path with light having a wavelength of 600 nm to 700 nm.

4. The method of claim 1, further comprising:
   contacting the cooling air flowing through the circulating airflow path with a charged plate that is charged positively.

5. The method of claim 1, further comprising:
   controlling a ratio of ozone concentration to nitrogen dioxide concentration in the cooling air (ozone concentration/nitrogen dioxide concentration) to be one or lower.

6. The method of claim 1, wherein the ozone concentration in the cooling air after passing through the ozone decomposition unit is 10% to 90% of the ozone concentration in the cooling air before passing through the ozone decomposition unit.

7. The method of claim 1, wherein the ozone decomposition unit has a honeycomb structure.

8. The method of claim 1, wherein the ozone decomposition catalyst comprises at least one of Mn, Pt, Pd, Fe, Ni and Ag.

9. The method of claim 1, wherein the ozone decomposition catalyst comprises manganese dioxide.

10. The method of claim 7, wherein the ozone decomposition catalyst is impregnated into the honeycomb structure.

11. The method of claim 1, wherein the ozone decomposition unit and the nitric acid adsorption unit are separate units positioned adjacent to one another in parallel in the circulating airflow path.

* * * * *